United States Patent [19]

Fermvik et al.

[11] 4,302,917
[45] Dec. 1, 1981

[54] METHOD AND MEANS FOR FIRE-SEALING A PENETRATION FOR A CONDUIT

[75] Inventors: Leif A. Fermvik; Bo E. Ohlsson; Aage E. Skinstad, all of Nyköping, Sweden

[73] Assignee: Telefonaktiebolaget L M Ericsson, Stockholm, Sweden

[21] Appl. No.: 74,383

[22] Filed: Sep. 11, 1979

[30] Foreign Application Priority Data

Sep. 15, 1978 [SE] Sweden .............................. 7809749

[51] Int. Cl.³ .............................................. E04B 5/48
[52] U.S. Cl. .................................... 52/221; 52/309.4; 52/577; 52/741; 248/56
[58] Field of Search .............. 52/221, 302, 305, 232, 52/220, 309.12, 405, 380, 381, 382, 503, 504, 577, 309.8, 309.4, 741; 249/175; 138/89; 248/56

[56] References Cited

U.S. PATENT DOCUMENTS

| | | | |
|---|---|---|---|
| 3,276,176 | 10/1966 | Jonsson et al. | 52/577 X |
| 3,655,907 | 4/1972 | Philibert et al. | 138/89 X |
| 3,976,825 | 8/1976 | Anderberg | 52/232 |
| 4,035,976 | 7/1977 | Downey | 52/577 |
| 4,061,344 | 12/1977 | Bradley et al. | 52/232 X |
| 4,086,736 | 5/1978 | Landrigan | 248/56 X |
| 4,221,092 | 9/1980 | Johnson | 52/232 |

Primary Examiner—Price C. Faw, Jr.
Assistant Examiner—Carl D. Friedman
Attorney, Agent, or Firm—Burns, Doane, Swecker & Mathis

[57] ABSTRACT

A fire-seal for a cable penetration is provided with a pre-fabricated fire-sealing body comprising a corrugated tubular casing filled with a pre-compressed fire resisting elastic silicon foam. The body is placed in a site-poured concrete wall before pouring, or in an aerated concrete block from which a fire wall is then built. A tubular tool with a removable tip is driven through the foam so that one or more conduits can be threaded through the tool and foam. The tool is thereafter withdrawn from the foam and opened along an axial slit so that it can be removed transverse to the conduit.

9 Claims, 8 Drawing Figures

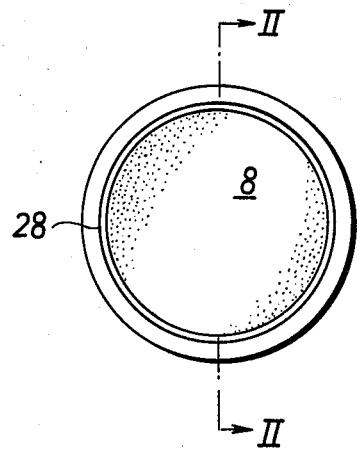
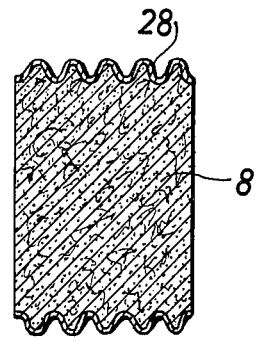
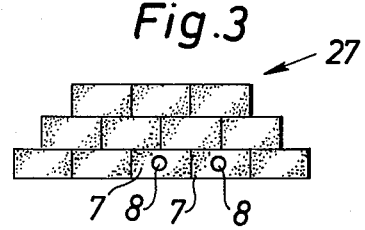
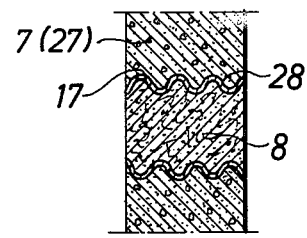
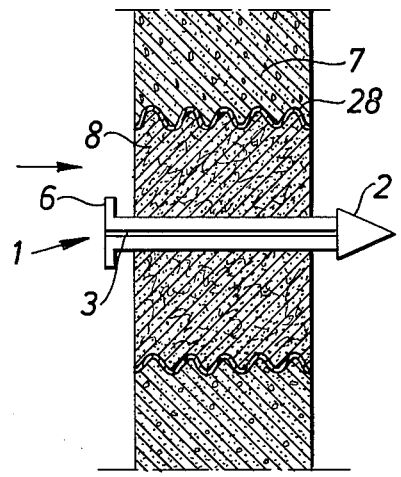

METHOD AND MEANS FOR FIRE-SEALING A PENETRATION FOR A CONDUIT

The invention relates to a method of fire-sealing a penetration for a conduit such as an electric cable, through a building part comprising a cast building member, an elastic fire resistant foam material being arranged in the penetration. The invention also relates to a means for carrying out the method.

Penetrations, that is the holes in walls or floors enabling the passage of electric cables, pipes, ventilation ducts or other building elements from one room to another, are always a great hazard in connection with fire, since they constitute obvious propagation paths for both smoke and flames. It is therefore of decisive importance for fire safety that the penetrations are sealed in a way which effectively prevents the spread of both smoke and fire. The penetration is usually provided by arranging a recess in a wall or the like during pouring or bricklaying etc. Alternatively, a penetration can be cut out in the ready-cast or built-up wall. At a later building stage, conduits are taken through these penetrations and the penetration is fire-sealed, i.e. the free space between the conduits and the wall of the penetration is filled with a fireproof filler.

It is known to fix a clamping frame in the penetration. This frame is filled with a plurality of parallelepipedic blocks. At least some of these blocks are parted and have semicircular cavities facing towards each other for accommodating a conduit. The cylindrical space between these block halves is filled out with a cylindrical sealing body which can also be removed to make room for a conduit. By clamping, the frame affords the desired tight engagement between the blocks and the conduits. The disadvantage with such a clamping frame is, however, that the blocks provided only afford a seal for certain cable or conduit dimensions and for a certain number of cables. In turn, this has resulted in the disadvantage that when supplementary cables are laid through such a frame, a complete block is removed so that the seal between the cable and the adjacent blocks is no longer effective. Furthermore, it has often been observed in conjunction with handling that blocks have been lost and have not been replaced, the firesealed penetration thus having through openings which nullify the fire resisting function of the device.

It is also known to utilize rubber grommets to seal a cable penetration (cf. British Patent No. 953,869), a tubular rubber stopper being pressed into the penetration, and a group of cables then being forced through the hole in the stopper. Such a technique is not particularly usable for fire-sealing purposes, since the cables must usually be pulled a long distance through the stopper, and a new penetration must be arranged and a new stopper provided if a further cable group is to be taken through the wall.

An in situ molding technique has therefore been adopted, which involves placing the cables or conduits in the penetration and temporarily sealing the penetration by shuttering, subsequent to which a fireresistant silicon rubber is foamed on site in the penetration. This technique is accounted for by Studsvik Energiteknik AB under the designation "Fire-sealing system FC-225", utilizing a silicon foam which is commercially available under the designation Dow Corning 3-6548 RTV. However, if it is subsequently desired to lay a conduit through a wall, for example, a further penetration for it should be made, e.g. in an existing wall and a sealing of the penetration using the FC-225-technique. This is difficult, especially if the wall is concrete, and expensive, not in the least with regard to wall coverings such as panelling and wallpaper, which are often damaged and must be replaced.

Alternatively, a hole can be drilled in a fire seal in an existing penetration, the annular gap between the hole and cable being sealed after laying the cable.

One object of the invention is therefore to provide a new technique for fire-sealing penetrations, where the above-mentioned disadvantages have been considerably reduced or eliminated.

In accordance with the invention, this object is achieved by a method of fire-sealing a penetration for a conduit through a building part comprising a cast building member, wherein an elastic fireresistant foam material is provided in the penetration, substantially by putting a prefabricated body in place before casting the building member, said body comprising a tubular jacket which is filled with foam material, keeping the foam material compressed transverse to the axial direction of the jacket, and placing the body with the longitudinal axis of the jacket approximately perpendicular to the opposing entrance surfaces of the building member, so that the conduit can be passed through the foam material of the cast-in body.

The conduit may be passed through the foam material of the cast-in body e.g. by driving a substantially tubular mandrel, with its forward end provided with a conical tip, through the body, exposing the central cavity of the mandrel, e.g. by removing the driving tip, threading the conduit through the mandrel and withdrawing the mandrel from the body so that the foam material resiliently comes into sealing engagement against the conduit, the tubular wall of the mandrel then being opened to remove the tool from the conduit transversely thereto. A tool for passing the conduit through the body thus comprises, for example, a substantially tubular, axially slit mandrel with a conical driving tip removably fitted to the forward end of the tool.

In the inventive method it is thus possible to utilize bodies which can be produced in a factory in circumstances where the foaming conditions can be controlled easily and well. The bodies can be produced in lengths corresponding to the thickness of the building members in which they are to be cast, e.g. aerated concrete blocks, such as Siporex ® blocks, or wall modules, or so-called flooring planks made from concrete or aerated concrete. Alternatively, the bodies can be manufactured and supplied in continuous lengths, so that such a length can be sawn on site to a suitable length for placing in a wall or a floor which is cast in concrete on site.

The inventive means for carrying out the method includes a prefabricated body comprising a tubular jacket filled with an elastic fire-resistant foam material, known per se, and which keeps the foam material compressed transverse to the longitudinal axis of the jacket, said body being intended for casting into the member. A conduit can be passed through the foam material of the cast-in body, e.g. with the help of the tool described above.

The jacket of the body is suitably made for form-locked retention in the cast building member, and the jacket wall can then be corrugated in the longitudinal direction of the jacket. The jacket can consist of a material with low heat conductivity, such as plastics material.

By the inventive method, and with the aid of the inventive firesealing body, building parts can be prepared for simplified conduit laying through the building part.

According to a first aspect of the invention, the body can be cast into a building member such as an aerated concrete block. When a wall is to be built up from such blocks, the wall can be provided at selected places with blocks provided with the inventive bodies. According to a second aspect of the invention, as previously mentioned, the body can be placed in a concrete wall before it is conventionally cast in situ.

By means of the technique discussed, the erected building parts will have satisfactory fire resistance (no open penetrations) directly after being finished. The fire-resistant foam materials useful for the bodies have high density and a high proportion of closed pores, thereby providing satisfactory sound insulation for the penetrations. The cast-in bodies can be easily penetrated, as required, with the aid of the tool described above, so that a further conduit can easily be laid through the penetration in such a way that it will be immediately sealed against fire in the penetration.

In the following, the invention will be described in the form of an example with reference to the accompanying drawing.

FIG. 1 is an end view of a fire-sealing body in accordance with the invention.

FIG. 2 is a section along the line II—II in FIG. 1.

FIG. 3 illustrates a building part in the form of a wall which has been built up with the help of building members including a fire-sealing body in accordance with the invention.

FIG. 4 is an axial section through the inventive body, as cast-in in a building member or a building part, the material surrounding the body forming a "penetration" for a conduit.

FIGS. 5–8 are sections corresponding to that in FIG. 4, and illustrate the sequence of work operations, using a penetrating tool for laying a conduit through the foam material of the body cast into the building member.

Figure 6:
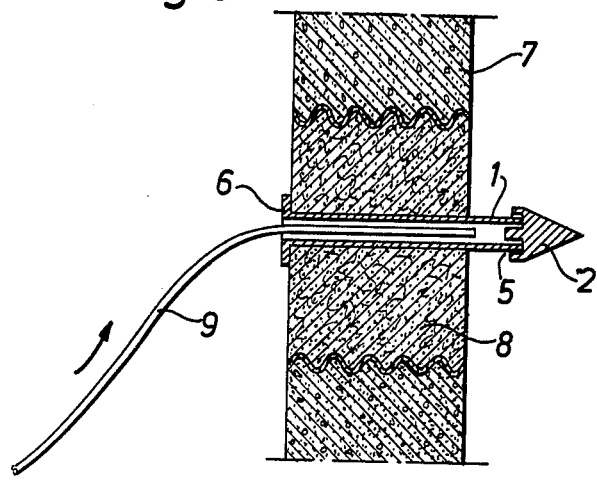

FIGS. 1 and 2 show an axially corrugated jacket 28 made from a thermoplastic such as polyethene, for example. The interior of the jacket 28 is filled with a fire-resistant silicon foam material, foamed in situ in the jacket so that the cured foam 8 is pre-compressed by the jacket 28.

In the factory production of a building member 7 (see FIG. 3) such as aerated concrete, the body defined by the jacket 28 and foam 8 can be cast into such a member. Building members 7 provided with such cast-in bodies 8,28 can be utilized together with ordinary building members 7' for constructing a building part 27, such as a separating wall in a building. A building member 7 with bodies 8, 28 can thus be laid in positions where there is reason to believe that fireproof penetrations for cables will be needed in the future.

As indicated in FIG. 4, a body 8, 28, in accordance with the invention, can also be cast in building parts on site, such as concrete walls, the peripheral portions of the body 8, 28 in the building part 27 defining a penetration 17. The foam 8 is suitably produced by a silicon foam commercially available under the designation Dow Corning 3-6548 RTV, this foam suitably being foamed on site in the jacket 28 while complying with the instructions in the Dow Corning publication FC-225.

FIG. 5 is a section corresponding to that in FIG. 4, but also shows a tool for laying a conduit through the foam material 8. The tool comprises a substantially tubular mandrel 1 having an axial slit 3. At the driving end of the mandrel 1 there is a removable conical driving tip 2, and at its rear end there are radial flange elements 6. The tool is driven through the body 8 in the direction indicated by the arrow, until the tip 2 has come outside the foam material 8. A conduit 9 can thereafter be passed through the central cavity of the portion 1 as indicated in FIG. 6, the removable tip 2 being knocked from the end of the portion 1 by means of the conduit 9. The conduit 9 can thereafter be passed through for a desired length, the radial flange elements 6 preventing the portion 1 from being pulled through the foam body 8 by friction against the conduit 9.

Figure 7:
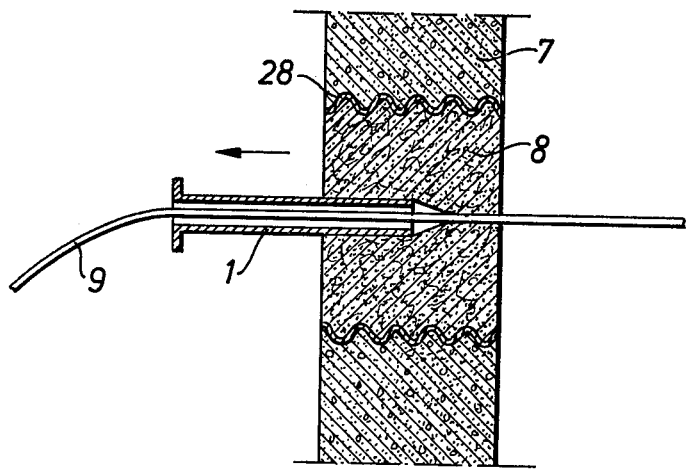
Figure 8:
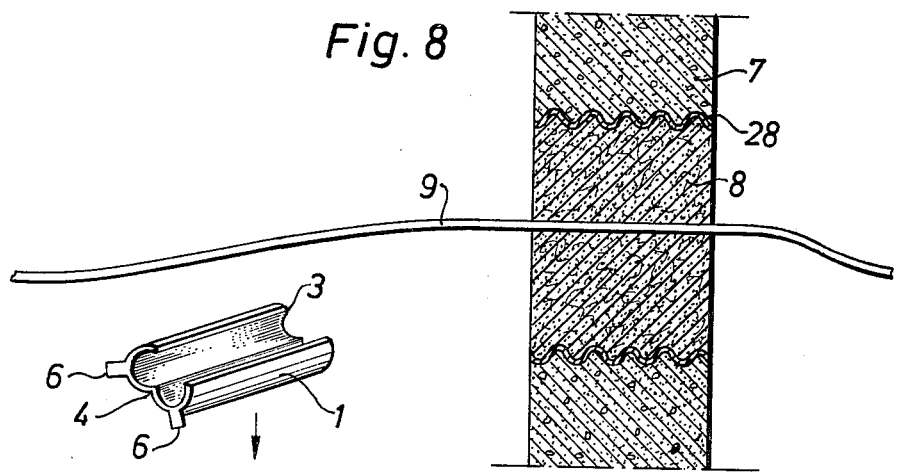

The portion 1 is then withdrawn, as indicated in FIG. 7, the foam material 8 resiliently returning to sealing engagement against the conduit 9. When the portion 1 is completely removed from the foam body 8, the axial slit 3 of the portion can be widened manually so that the portion can be removed from the conduit transverse to the conduit, as indicated in FIG. 8. The portion 1 preferably has a hinge 4 opposite the slit 3 to facilitate opening it.

By "conduit" is here intended an electric cable, a pipe, a ventilation duct or the like. The expression "conduit" can naturally also embrace a group of said members, e.g. a group of electric cables.

The tool is suitably made from an electrically insulating material such as a plastic material, and preferably one having low friction against the silicon foam body 8, polytetrafluoroethylene conceivably being a suitable material for the portion 1 of the tool.

The inventive fire-sealing body can have substantially optional cross sectional shape. The cross section of the body is preferably circular, but square, rectangular or oval shapes are also conceivable, for example.

By keeping the foam compressed in the jacket two advantages are won, namely that the foam expands and fills out the penetration, should the jacket be destroyed by fire or should the penetration cross-section be enlarged due to e.g. heat expansion, and that the foam offers a good grip against the conduits, preventing easy pull-out of the conduits from the penetration.

We claim:

1. A means for fire-sealing a penetration for a conduit through a building part, comprising a cast building member having a prefabricated body comprising a tubular jacket filled with a resilient, fire-resistant foam material, said jacket keeping the foam material compressed transverse to the longitudinal axis of the jacket, said body being intended for placing in the member in conjunction with casting the latter, so that a conduit can be passed through the foam material of the cast-in body.

2. A means as claimed in claim 1, characterized in that the jacket is designed for form-locked retention when cast in the member.

3. A means as claimed in claim 2, characterized in that the jacket wall is corrugated in the longitudinal direction of the jacket.

4. A means as claimed in claim 1, characterized in that the jacket consists of a material having low heat conductivity.

5. A means as claimed in claim 1, characterized in that the body has a circular cross sectional shape.

6. A means as claimed in claim 1, characterized in that the body has a rectangular cross sectional shape.

7. A method for passing a conduit through a structural member in a manner which inhibits the spreading of fire, comprising the steps of:

filling a tubular jacket with a resilient fire-resistant foam material such that the foam material is compressed in a direction transverse to the longitudinal axis of the jacket;

casting the foam-filled jacket in the structural member with its longitudinal axis approximately perpendicular to the opposing surfaces of the structural member; and passing the conduit through the foam material such that the compressive forces on the material cause it to sealingly engage the conduit.

8. The method of claim 7 wherein the step of passing the conduit through the foam material comprises:

inserting a tubular mandrel through the foam material to thereby provide a passage therethrough;

passing the conduit through the mandrel; and removing the mandrel from the foam material to thereby allow the foam material to come into sealing engagement with the conduit.

9. A method as claimed in claim 7, characterized in that the body is cut off in a length corresponding to the thickness of the building member before it is cast into said member.

* * * * *